April 5, 1960     H. H. MABRY     2,931,528
AUTOMOBILE TOP LOAD CARRIERS

Filed Feb. 12, 1958     3 Sheets-Sheet 1

Harry H. Mabry
INVENTOR.

BY *Clarence A. O'Brien*
and *Harvey B. Jackson*
Attorneys

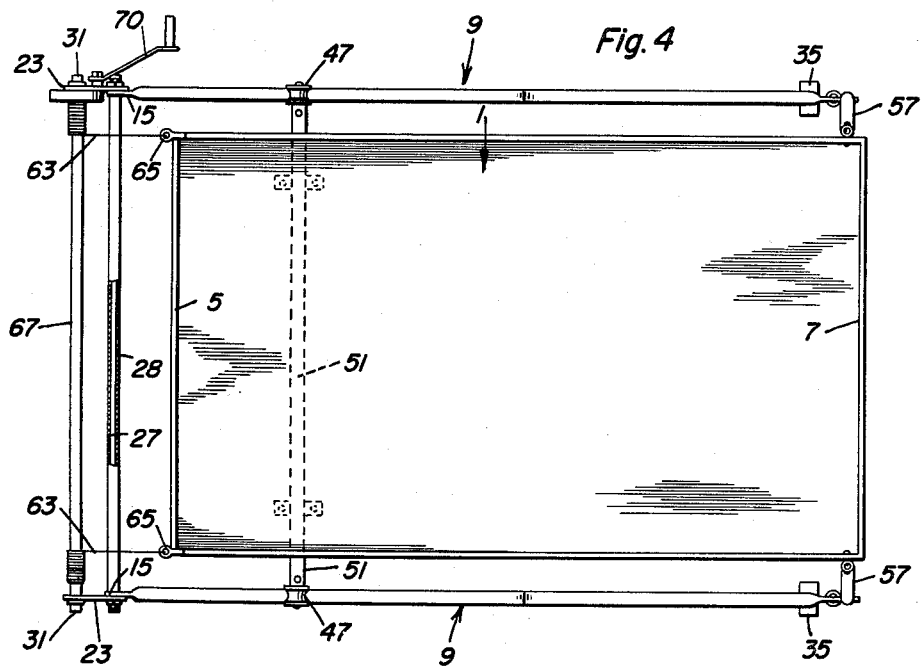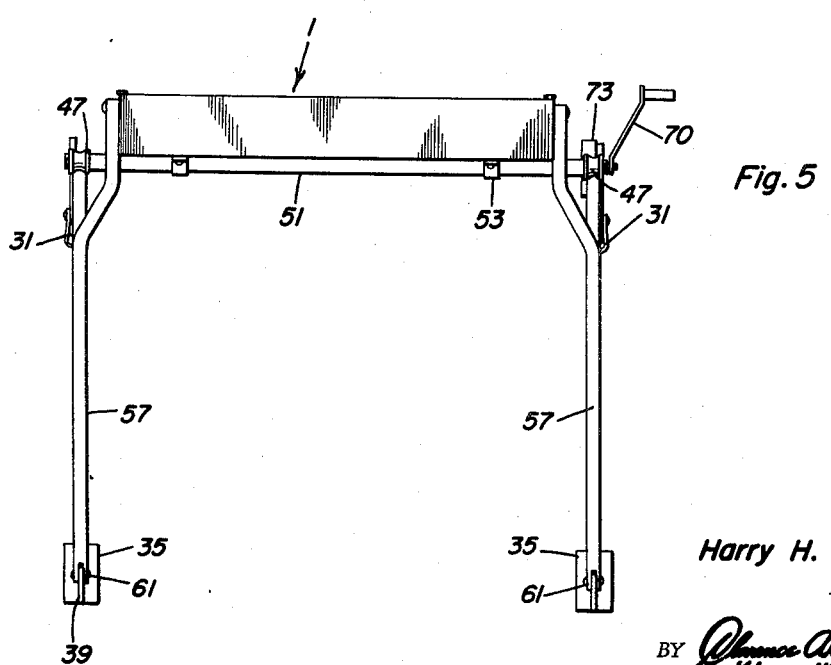

April 5, 1960  H. H. MABRY  2,931,528
AUTOMOBILE TOP LOAD CARRIERS
Filed Feb. 12, 1958  3 Sheets-Sheet 3
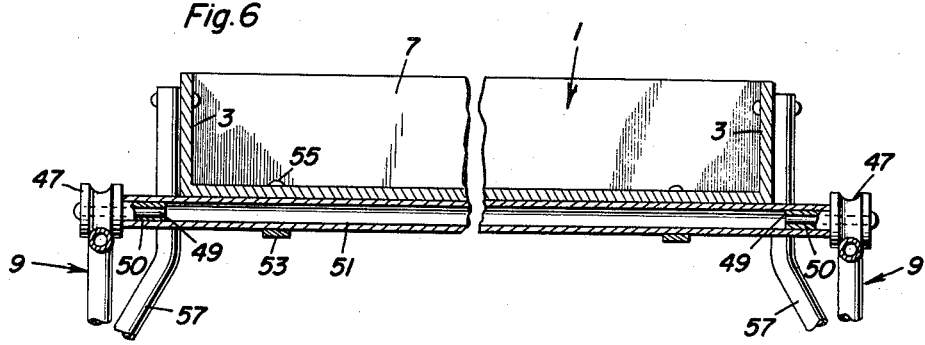
Fig. 6
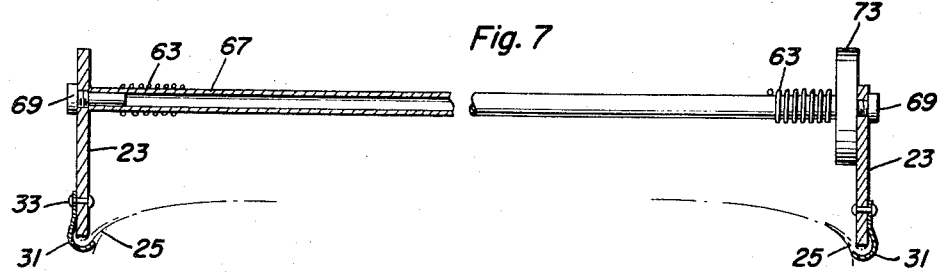
Fig. 7
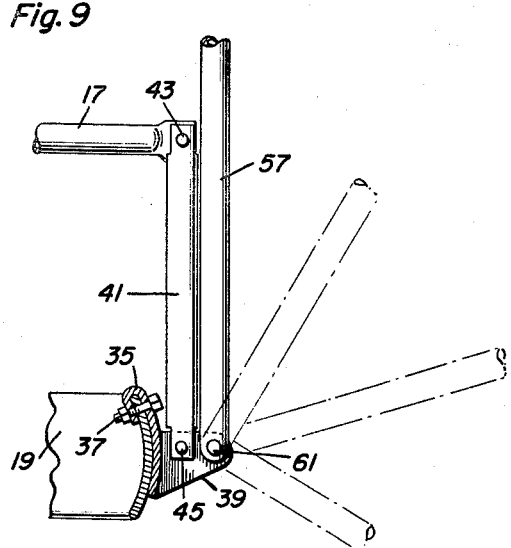
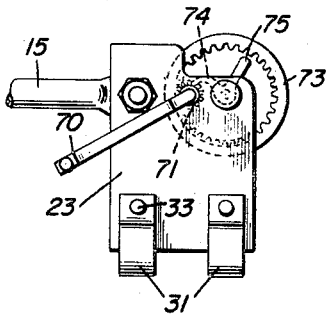
Fig. 8
Fig. 9
Harry H. Mabry
INVENTOR.
BY *Clarence A. O'Brien*
*and Harvey B. Jacobson*
Attorneys United States Patent Office 2,931,528
Patented Apr. 5, 1960

2,931,528
AUTOMOBILE TOP LOAD CARRIERS
Harry H. Mabry, Vandalia, Ill.
Application February 12, 1958, Serial No. 714,854
4 Claims. (Cl. 214—450)

My invention relates to improvements in automobile top load carrier attachments for automobiles of the type having a hard top spaced above a rear trunk section.

The primary object of my invention is to provide box body for carrying luggage, boats, and other articles on such an automobile in elevated position over the automobile top, together with means attachable to the box body, automobile top gutters, and rear bumper for supporting the box body in downwardly and rearwardly inclined rear loading and dumping position behind the trunk or into forward or intermediate raised positions respectively, with the box body spaced above the top in its forward position and spaced above the trunk level and behind the top in its intermediate position.

Another object is to provide in conjunction with the foregoing manually operable means for easily moving the box body forwardly from its rear position into its intermediate and forward positions, respectively, and retaining the same against movement rearwardly.

Still another object is to provide a load carrier attachable as in the foregoing which is easy to attach, will not mar or damage the automobile and is of very simple inexpensive construction and light in weight yet strong and durable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Fig. 4 is an enlarged view in plan of the carrier;

Figure 5 is an enlarged view in rear elevation of the same;

Figure 6 is an enlarged fragmentary view in cross section partly broken away and taken on the line 6—6 of Figure 1;

Figure 7 is an enlarged view in cross section partly in elevation and taken on the line 7—7 of Figure 2;

Figure 8 is an enlarged fragmentary view in side elevation of a gear drive forming part of the manually operable means, and Figure 9 is an enlarged fragmentary view in vertical section of parts of the means for attaching the supporting means to the rear bumper.

Figure 1:
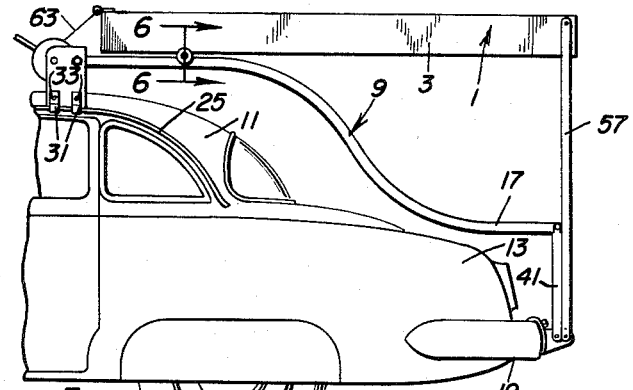
Figure 1 is a fragmentary view in side elevation of my carrier with the box body supported in raised forward position.

Referring to the drawings by numerals, the carrier of my invention comprises a rectangular open top box body 1 of shallow form and sheet metal having sides 3 and front and rear ends 5, 7.

The means for supporting the box body 1 comprises the following.

A pair of track rails 9 preferably of tubular metal are provided to extend longitudinally over the automobile top 11 and trunk section 13 in vertically spaced relation thereto and along opposite sides thereof. The track rails 9 are each provided with a horizontal, high, front end portion 15 adapted to overlie the top 11, a horizontal low rear end portion 17 adapted to overlie the trunk section 13 and the rear bumper 19 of the automobile, and an intermediate riser portion 21 of compound curvature curving upwardly and forwardly from the rear end portion 17 to the front end portion 15 behind the top 11.

The track rails 9 are terminally supported at the front end portions 15 thereof by means of a pair of upright rectangular bracket plates 23 of sheet steel seating in the side gutters 25 of the top 11 and cross connected rigidly by a steel bolt 27 extended through said front end portions 15 and through a steel pipe 28 spacing said end portions 15 apart and thereby spacing said plates 23 apart.

A pair of leaf spring hold down clamps 31 on each bracket plate 31 bolted, as at 33, to the bracket plates 23 and depending therefrom are provided for snapping under the gutters 25 to detachably secure said bracket plates 23 in place.

The rear end portions 17 of the track rails 9 are terminally supported by the rear bumper 19 by the following means. A pair of hooked plates 35 are provided to hook over the rear bumper 19 and are bolted thereto, as at 37, at opposite sides of the trunk section 13 and formed with rearwardly extending ears 39. A pair of upright legs 41 of tubular metal are bolted, as at 43, 45, to said rear end portions 17 and to said ears 39.

The box body 1 is rollably mounted adjacent its front end on the track rails 9 for forward and rearward movement by a pair of grooved rollers 47 of suitable material such as hard rubber, nylon, or the like. The rollers 47 are fixed on shafts 49 journaled in bushings 50 in the ends of a steel pipe 51 extending transversely beneath and fixed to the box body 1. The steel pipe 51 is fixed by brackets 53 and bolts 55 and spaces the rollers 47 outwardly of opposite sides of said body 1.

A pair of body lifting and lowering arms 57 at opposite sides 3 of the box body 1 are pivoted at upper ends thereof as at 59 to said sides 3 adjacent the read end of said body and have their lower ends pivoted, as at 61, to the ears 39.

Cable wind-up means is provided for pulling the box body 1 forwardly. This means comprises a pair of wire cables 63 terminally fixed to eye members 65 on opposite sides 3 and at the front end of the box body 1 and which are coiled around a tubular roller member 67 preferably a steel pipe extending between the bracket plates 23 in front of the pipe 28 and journaled on stud bolts 69 extended through said plates 23 into opposite ends of said member 67 so that said member 67 is rotatable to wind up the cables 63. The roller member 67 is rotatable by means of a crank 70 journaled in one bracket plate 23 and operatively connected to a gear pinion 71 meshing with an internal gear 73 fast on one end of said member 67. A conventional ratchet pawl 74 journaled in the bracket plate 23 and provided with a releasing handle 75 dogs the pinion 71 to prevent reverse rotation thereof and thereby hold the cables 63 in wound up condition.

Figure 2:
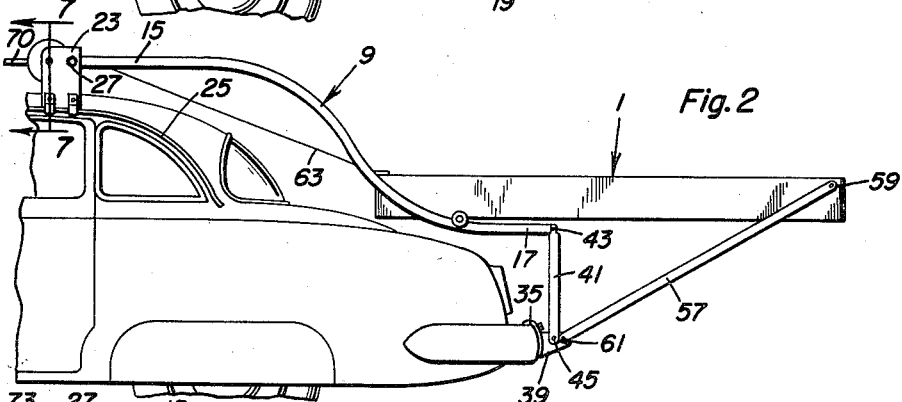
Figure 2 is a fragmentary view in side elevation with the box body supported in an intermediate position.
Figure 3:
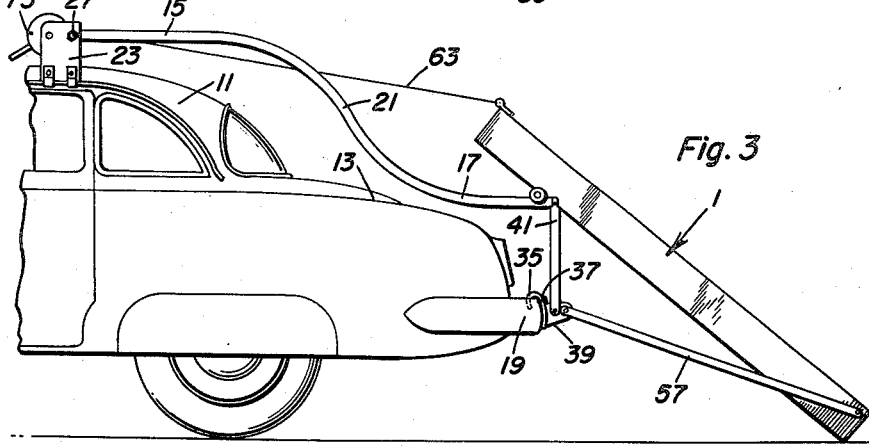
Figure 3 is a fragmentary view in side elevation with the box body supported in rear loading and dumping position.

The operation of the invention will be readily understood. To load the box body 1, the ratchet pawl 74 is released and held in that position. The box body 1 may then be pushed rearwardly on the track rails 9 and will after a starting push gravitate down said track rails and tilt thereon downwardly and rearwardly into an inclined rear loading position to rest on the ground as shown in Figure 3. By operating the crank 70 the cable may then be wound up to pull the box body 1 forwardly into either the intermediate raised position shown in Figure 2 or the forward raised position shown in Figure 1. In its intermediate position the box body is disposed over the trunk section 13 in the rear of and below the top 11 with the rollers 47 resting on the rear end portions 17 of the track rails 9. In the forward position thereof the box body 1 is disposed above the top 25 with the rollers 47 resting on the front end portions 15 of the track rails 9. In response to pulling of the box body forwardly from loading and dumping position into either intermediate or forward position the arms 57 swing the rear end of the box body 1 upwardly into level position and maintain said box body 1 level. As the box body 1 is pulled forwardly from its intermediate position the rollers 47 ride up the intermediate portions 21 of the track rails 9 to elevate the front end of said body. Obviously initially pushing the box body 1 rearwardly from its forward position until the rollers 47 engage the intermediate portions 21 of the track rails, the box body can gravitate into its intermediate position or its loading position under control of the wind-up cables 63.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. In combination with an automobile, an automobile top load carrier comprising a pair of side track rails each including a horizontal front end portion for extending longitudinally over an automobile top, a horizontal rear end portion adapted to extend longitudinally over a low trunk section of an automobile, and an intermediate riser portion curving upwardly and forwardly between said end portions and adapted to extend upwardly behind said top, first means supporting said front end portions fixed to side gutters on an automobile top, second means supporting said rear end portions fixed to the rear bumper of an automobile, a box body having front and rear ends, a pair of rollers supporting the front end of the box body on said track rails for tilting downwardly and rearwardly on said rear end portions and for movement of said box body upwardly and forwardly on said rails over said top, a pair of lift arms terminally pivoted on said second means and terminally pivoted to the rear end of said box body and operative in response to forward movement of said box body to lift said rear end of the box body for leveling the same, and means for moving said box body forwardly comprising a cable wind-up roller rotatably mounted on said first means transverse of the axis of symmetry of said automobile, and wind-up cables operatively connected on said roller.

2. In combination with an automobile, an automobile top load carrier comprising a pair of side track rails each including a horizontal front end portion for extending longitudinally over an automobile top, a horizontal rear end portion adapted to extend longitudinally over a low trunk section of an automobile, and an intermediate riser portion curving upwardly and forwardly between said end portions and adapted to extend upwardly behind said top, first means supporting said front end portions fixed to side gutters on an automobile top, second means supporting said rear end portions fixed to the rear bumper of an automobile, a box body having front and rear ends, a pair of rollers supporting the front end of the box body on said track rails for tilting downwardly and rearwardly on said rear end portion and for movement of said box body upwardly and forwardly on said rails over said top, a pair of lift arms terminally pivoted on said second means and terminally pivoted to the rear end of said box body and operative in response to forward movement of said box body to lift said rear end of the box body for leveling the same, and means for moving said box body forwardly comprising a cable wind-up roller rotatably mounted on said first means transverse of the axis of symmetry of said automobile, and wind-up cables operatively connected on said roller, said first means comprising a pair of upright bracket plates seated in side gutters of the top of said automobile, and clamps on said plates attached to such gutters.

3. In combination with an automobile, an automobile top load carrier comprising a pair of side track rails each including a horizontal front end portion for extending longitudinally over an automobile top, a horizontal rear end portion adapted to extend longitudinally over a low trunk section of an automobile, and an intermediate riser portion curving upwardly and forwardly between said end portions and adapted to extend upwardly behind said top, first means supporting said front end portions fixed to side gutters on an automobile top, second means supporting said rear end portions fixed to the rear bumper of an automobile, a box body having front and rear ends, a pair of rollers supporting the front end of the box body on said track rails for tilting downwardly and rearwardly on said rear end portions and for movement of said box body upwardly and forwardly on said rails over said top, a pair of lift arms terminally pivoted on said second means and terminally pivoted to the rear end of said box body and operative in response to forward movement of said box body to lift said rear end of the box body for leveling the same, and means for moving said box body forwardly comprising a cable wind-up roller rotatably mounted on said first means transverse of the axis of symmetry of said automobile, and wind-up cables operatively connected on said roller, said first means comprising a pair of upright bracket plates seated in side gutters of the top of said automobile, and clamps on said plates attached to such gutters, said second means comprising a pair of legs depending from said rear end portions and supporting same, and a pair of hooked plates attached to and supporting said legs and attached over a rear bumper of said automobile.

4. In combination with an automobile, an automobile top load carrier comprising a pair of side track rails each including a horizontal front end portion for extending longitudinally over an automobile top, a horizontal rear end portion adapted to extend longitudinally over a low trunk section of an automobile, and an intermediate riser portion curving upwardly and forwardly between said end portions and adapted to extend upwardly behind said top, first means supporting said front end portions fixed to side gutters on an automobile top, second means supporting said rear end portions fixed to the rear bumper of an automobile, a box body having front and rear ends, a pair of rollers supporting the front end of the box body on said track rails for tilting downwardly and rearwardly on said rear end portions and for movement of said box body upwardly and forwardly on said rails over said top, a pair of lift arms terminally pivoted on said second means and terminally pivoted to the rear end of said box body and operative in response to forward movement of said box body to lift said rear end of the box body for leveling the same, and means for moving said box body forwardly comprising a cable wind-up roller rotatably mounted on said first means transverse of the axis of symmetry of said automobile, and wind-up cables operatively connected on said roller, said first means comprising a pair of upright bracket plates seated in side gutters of the top of said automobile, and clamps on said plates attached to such gutters, said second means comprising a pair of legs depending from said rear end portions and supporting same, and a pair of hooked plates attached to and supporting said legs and attached over a rear bumper of said automobile, said lift arms being pivoted to said hooked plates.

References Cited in the file of this patent

UNITED STATES PATENTS

| | | |
|---|---|---|
| 2,567,104 | DiFonza | Sept. 4, 1951 |
| 2,573,187 | Desilets | Oct. 30, 1951 |
| 2,613,020 | Berry | Oct. 7, 1952 |
| 2,663,473 | McMillan | Dec. 22, 1953 |
| 2,849,135 | Embler | Aug. 26, 1958 |
| 2,896,804 | Ingram | July 28, 1959 |